United States Patent [19]

Fleck et al.

[11] Patent Number: 5,552,585

[45] Date of Patent: Sep. 3, 1996

[54] MICROWAVE COOKING VESSEL WITH REMOVABLE FOOD SUPPORTS

[76] Inventors: Jonathan E. Fleck; Abigail M. Fleck, both of 425 Hall Ave., both of St. Paul, Minn. 55110-1828

[21] Appl. No.: 319,303

[22] Filed: Oct. 6, 1994

Related U.S. Application Data

[63] Continuation-in-part of Ser. No. 14,674, Oct. 27, 1993, Pat. No. Des. 366,807.

[51] Int. Cl.⁶ .................................................. H05B 6/80
[52] U.S. Cl. .................... 219/732; 219/733; 99/DIG. 14; 99/444; 99/448
[58] Field of Search ........................ 219/732, 733, 219/762; 99/444, 445, 446, 448, 449, 425, 427, DIG. 14

[56] References Cited

U.S. PATENT DOCUMENTS

| | | | |
|---|---|---|---|
| 2,826,982 | 3/1958 | Smith | 99/393 |
| 3,713,379 | 1/1973 | Gordy | 99/349 |
| 4,074,102 | 2/1978 | Asen | 219/733 |
| 4,343,978 | 8/1982 | Kubiatowicz | 219/733 |
| 4,887,523 | 12/1989 | Murphy et al. | 99/444 |
| 4,924,049 | 5/1990 | Dexter, Jr. | 219/732 |
| 4,933,528 | 6/1990 | Barr | 219/732 |
| 4,952,764 | 8/1990 | Harrington | 219/732 |
| 5,057,331 | 10/1991 | Levinson | 219/732 |

*Primary Examiner*—Philip H. Leung
*Attorney, Agent, or Firm*—O'Connor & O'Connor

[57] ABSTRACT

Foods cook especially effectively in microwave ovens when raised above the level of the floor of the oven, and arrayed to occupy the volume of the oven chamber while the food portions, such as bacon strips, are hung to permit grease to rapidly drain from the cooking strips. The disclosed system 10 includes a dish 12 sized to catch the resulting liquids. food supports 14 which attach to protrusions 28 projecting up from the bottom of the dish. The system is held together for sale or storage by a clip 80 which attaches to these same protrusions to trap the upright supports in the dish cavity. The dish preferably includes a handle 24 with cooling ribs 26.

8 Claims, 3 Drawing Sheets

MICROWAVE COOKING VESSEL WITH REMOVABLE FOOD SUPPORTS

REFERENCE TO RELATED PATENT APPLICATIONS

This application is a Continuation-in-Part application of pending application Ser. No. 29/014,674, filed Oct. 27, 1993 U.S. Pat No. Des. 366,807.

FIELD OF THE INVENTION

The present invention relates to cooking utensils and more particularly to cooking vessels designed for microwave ovens using various means of supporting the object to be irradiated above the floor plane of the microwave oven with a dish or basin below to contain drippings.

BACKGROUND OF THE INVENTION

Previous devices have been proposed for use with microwave ovens to support the food above the floor plane of the microwave oven. In most cases these have been designed for the cooking of bacon. For example, U.S. Pat. No. 4,924,049 to Dexter, Jr. shows an enclosed box with a raised series of fixed internal racks aligned so as to be able to drape strips of bacon to be cooked in a microwave oven. Dexter's invention, however, doesn't address any other applications for use other than the "bacon box" or address the issue of the considerable drippings that will result from the cooking process (bacon often contains over 70% fat).

U.S. Pat. No. 4,343,978 to Kubiatowicz similarly shows a box with racks to drape bacon strips for microwave cooking. This invention is designed as a disposable structure for a single purpose use. In Kubiatowicz, the racks are moveable, and are supported by the upper edges of the box walls. Kubiatowicz is practically limited to food types which are able to be draped over the racks, such as bacon. Furthermore these two examples of prior art may affect some other aspect of food preparation (moisture loss, heat loss via radiation) due to the interference by the relatively broad surfaces of the surrounding container or support members.

U.S. Pat. No. 4,074,102 to Asen shows a microwave cooking rack which provides a series of parallel ribs or other attachment means to receive slidably mounted meat holders whose position can be adjusted to support various types above the floor of the microwave oven for cooking. Asen's invention addresses the residual drippings and a need to somehow retain them, but doesn't teach means of positively securing the vertically positioned meat holders to a dish. Therefore another dish (that may be too big, or not deep enough) must be dirtied and will require careful handling so as to not allow the vertical supports to fall over or slide about in the tray as it is being handled. Also as in the two inventions cited above where the walls encumber the flow of microwaves, the meat racks in Asen's patent may inhibit the flow of microwaves and therefore will result in less even cooking and more time required.

Thus these prior art devices are cumbersome to use and store, difficult to clean and handle, especially when the need to additionally provide a receptacle to support the racks, boxes and contain the drippings from the cooking food. Additionally these patents do not address a means of support that do not encumber the flow of microwaves to allow for minimum cooking times and even cooking.

What would be clearly desirable would be a system of a floor supported vessel and interchangeable supports and which would allow the cooking or irradiation of food or other objects desired in a plane above that of the microwave oven's floor. Also desired would be the ability to use such a system, or at least portions of such system, as an aid on other kitchen duties as diverse as helping preparation and storage quiescently frozen confections.

SUMMARY OF THE INVENTION

The present invention provides a system of interchangeable and variable supports to allow improved microwave cooking of a great variety of foods.

It is a well known phenomenon that a microwave oven will cook food much more effectively when the food is raised above the floor plane of the microwave oven. This is because modern microwave ovens operate by means of scrambling the microwave radiation emitted from the magnetron around the microwave oven by means of microwave reflective blades on an internal rotating fan. When the food is raised above the floor plane of the microwave oven, then, the scrambled microwaves will be absorbed by not only the top and sides of the food, but by all surfaces equally. This allows a much more even and consistent absorption by the food of the microwave radiation. Evenness and consistency, in turn, permit a shorter cooking time, a more desirable food and thus, much more efficient and effective use of the microwave oven.

The present invention includes a dish base having a series of receptacles or bosses adapted to accept any of a series of supports specifically designed to hold a variety of food types or other objects above the floor plane of a microwave oven as well as the dish base which would allow for foodstuffs to be prepared within this base on the floor plane of the microwave oven. The dish base will be comprised of at least two separate cavities separated by a septum which will allow for the cooking of at least, but not limited to two types of food simultaneously, i.e. kernel corn and peas. Additionally, the receptacles or bosses would allow for the supports to be engaged to the dish base by means of either the inner diameter or the outer diameter of the receptacle or boss. A handle for allowing one hand operation of the unit is attached to the dish base. The handle is designed to dissipate heat and also, with its deep ribs allows for a positive gripping that can be done in the event hot liquids may have in the process of cooking or handling found themselves on to the handle. The handle is designed ergonomically with a thumb depression with ribs on the top that counter one another at 90 degrees from those which are placed on the bottom portion of the handle. All components of the system are manufactured from materials which are compatible with conditions existing in conventional ovens, microwave ovens and in freezer units. This is advantageous as it allows frozen food items to be placed directly into a microwave oven for cooking and onto a conventional oven for browning, thus eliminating steps in the cooking process as well as eliminating the number of dishes it takes to prepare a food type making cleaning more convenient and easier.

This system for improving the performance of a microwave oven comprises a dish base unit having a lower surface for resting on the floor of the microwave oven; contiguous raised sides surrounding the lower surface. These sides are substantially adjacent in angle to the lower surface. A handle is attached to the dish base unit. Receptacles project from the lower inside surface of the base unit or dish for firmly attaching upright, replaceable supports. The upright, replaceable supports allow the item desired to be irradiated to be raised above the oven's lower surface.

Preferably, all components are fabricated from a microwave compatible material as well as from a freezer compatible material. These receptacles comprise a raised structure terminating below the uppermost edge of the raised sides and defines a circular aperture adapted to receive the upright, replaceable supports. These supports preferably include uprights shaped to be firmly received in the receptacles, and substantially horizontal cross pieces supported by a centrally mounted substantially vertical member, the lower end of which is adapted to be received by the receptacle.

The invention also contemplates a dish for use in a microwave oven or the like including upstanding sides which form, together with a generally flat bottom, a vessel for retaining liquids, at least one protrusion projecting up from the generally flat bottom for removably attaching an upright support, the protrusion being spaced from the sides. this protrusion preferably has a socket projecting up from the flat bottom,the socket having sides extending from the bottom to a top portion, and a cavity in the top portion to receive a portion of the upright support.

Also part of the subject invention is a combination microwavable dish and bacon supports sold as a unit, the dish having an internal liquid receiving volume, means for attaching the supports to the dish when the dish and the support means are being used to cook bacon in a microwave oven, and a means for holding the support means in the dish such that the supports are substantially contained within the volume, whereby the dish, the support means and the means for holding form one compact unit for convenient transport and storage. The means for holding is attached to the dish by the means for attaching.

It is an object of this invention to provide a system to enhance the effect and ease of using a microwave oven by raising the food above the floor plane of the microwave oven, while also providing a means of cooking foodstuffs that maybe recognized as being best prepared on a horizontal plane within the dish with no support systems.

It is another object of the present invention to provide a system of interchangeable, variable, and replaceable supports, as well as a stable base to mount them in, to allow various types of food to be irradiated in a microwave oven.

It is yet another object of this invention to provide enhanced cleanability of a microwave cooking system by permitting the removal of supports, as well as well as rounded interior surfaces and a septum dividing the base unit.

It is a further object of this invention to provide a system constructed of a material which is compatible with conditions existing in conventional ovens, microwave ovens and in freezer units.

The objects as described, and other objects of the invention as well as other advantages of it, will become more obvious when the following detailed description and accompanying drawings are referred to.

DETAILED DESCRIPTION OF THE PREFERRED EMBODIMENT

Figure 1:
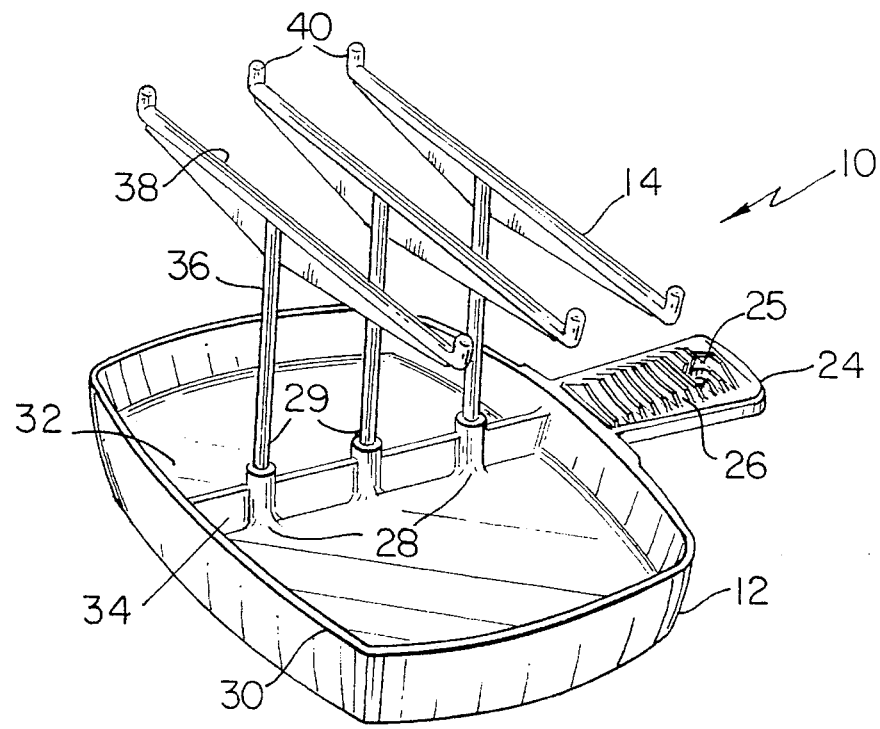
FIG. 1 shows a perspective view of a microwave cooking system of the present invention, showing the removable drip bar supports mounted in the base unit.
Figure 2:
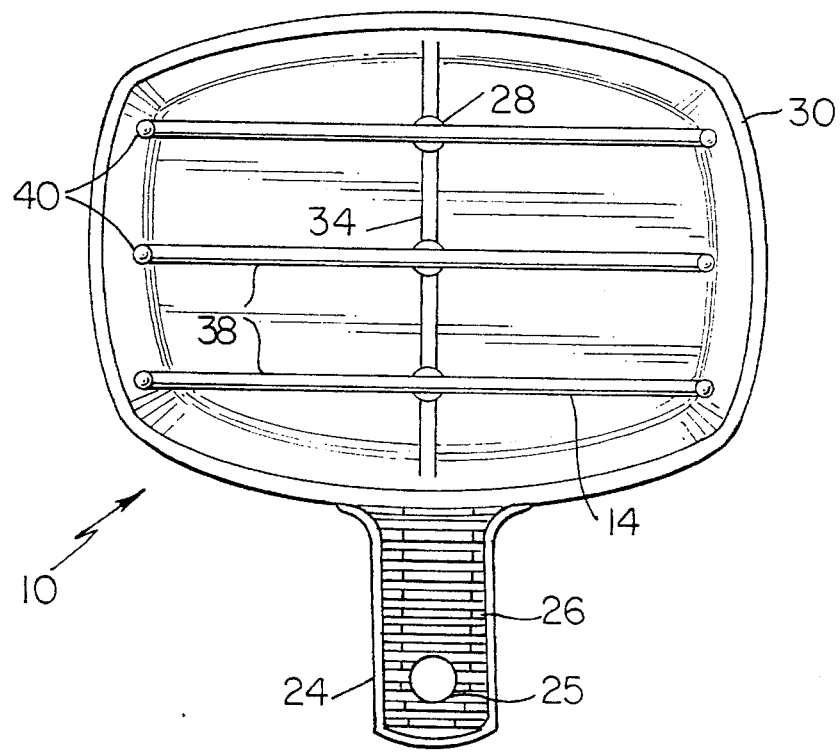
FIG. 2 shows a plan view of a microwave cooking system of an embodiment of the present invention.
Figure 3:
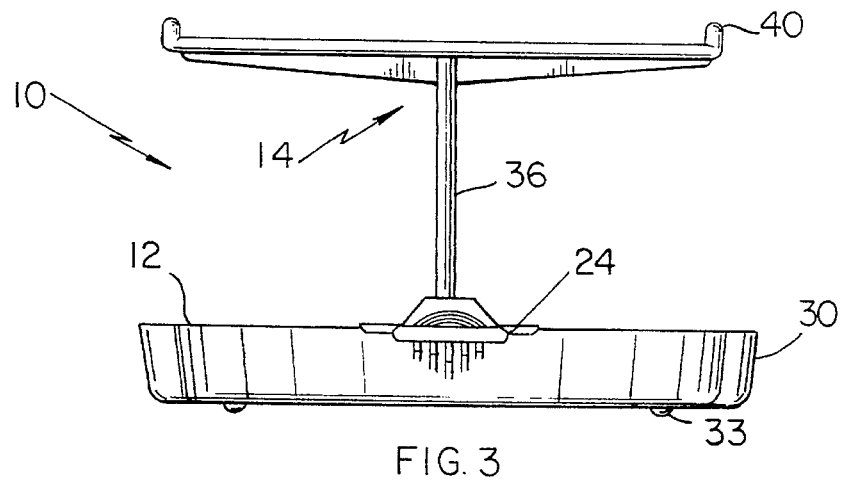
FIG. 3 shows an end view of a microwave cooking system of an embodiment of the present invention.
Figure 5:
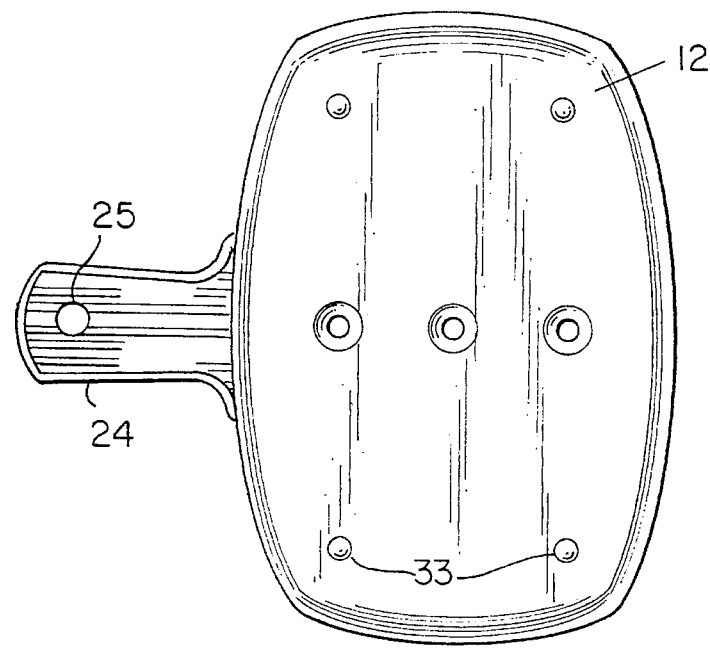
FIG. 5 shows a bottom view of the base unit.
Figure 4:
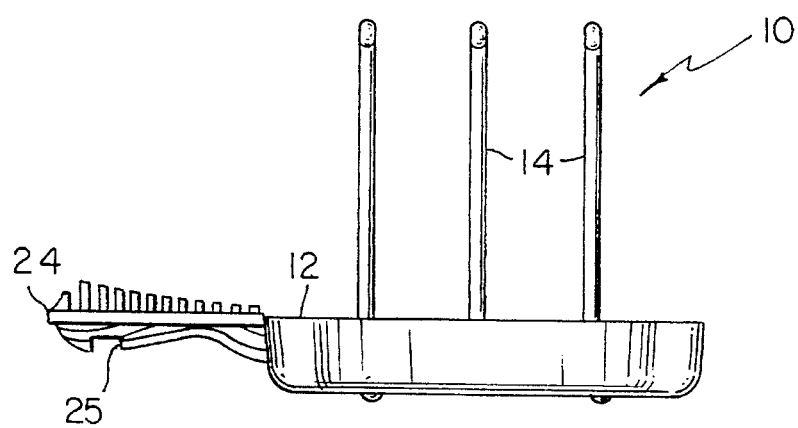
FIG. 4 shows a side view of a microwave cooking system of an embodiment of the present invention.

In referring to the drawings accompanying the preferred embodiment of the invention, like numerals designate like structure. While specific terminology is used in the description, the invention should not be construed as being limited to the terminology as used. The terms should be considered as also including all technical equivalents which perform the same function in the same way.

Referring to the drawings, and in particular, FIG. 1, the overall system is designated as 10 and includes a base unit 12, which includes a handle 24 having integrated ribs 26. The ribs 26 contribute to strength and heat dissipation as well as a positive gripping surface to the handle while adding very little weight. Hole 25 passes through the axial center of the handle 24 and provides a convenient way for the consumer to store the system, as well as permits the system to self merchandise on a peg or rack system, as will be detailed below. The preferred food support configuration is illustrated by a series of drip bars 14 which are designed to be supported by and fitted into or around integrally formed protrusions 28, here shown as integrated receptacles or bosses 28. The supports 14 each contain at least one upright shaft 36, the outer diameter of which is adapted to frictionally fit into inner aperture or socket 29 of each of the receptacles 28. It is also noted that these shafts 36 may secure to the outer diameter of the protrusions and have an aperture within an end portion of the shafts 36 to engage the outer diameter of a corresponding protrusion 28. The shape of the inner aperture (and the corresponding surface of the shaft portions which the inner aperture would engage) can be either round or angular. The receptacles 28 are designed to terminate below the upper level of the sides 30 of the base unit 12.

The base unit 12 comprises a floor 32 which is planar and normally parallel with the floor of the microwave oven, and upright sides 30 which are angled to and integrally formed with the floor 32 of the base unit. Where the sides 30 are integrated with the floor 32 of the base unit 12, the inner surfaces should be smoothly curved to facilitate cleaning. Similarly, the outer surfaces of the protrusions, and the surfaces where these outer surfaces intersect the other surfaces of the base unit 12 are similarly filleted into one another. The base unit 12 also comprises a septum 34 or plural septa to divide the base unit into separate sections. In addition to increasing the usefulness of the invention as a whole by dividing the base unit 12 into separate sections, the septum 34 can also provide additional support and strength to the receptacles 28, which can be integrally formed into the septum 34.

As seen in FIGS. 1–4, a drip bar 14 type of support is illustrated. The drip bar support 14 is comprised of an upright member 36 which is adapted to snugly fit into or around the receptacle 28, so as to create a sturdy support. Attached to the upright member 36 is a cross bar 38. Each end of the cross bars has upwardly extending generally cylindrical protrusions 40 having a diameter about the same as the lower end of shaft supports 36. These protrusions serve to help keep food, specifically bacon strips, from sliding off the ends. As will be detailed below, these protrusions can also serve to attach further food support members in a branching or dendritic fashion so that more individual food portions or different types of foods can be cooked simultaneously or independently. The cross bar 38, the upright member 36, and the protrusions 40 are all of a relatively small cross section. In the preferred embodiment, these structures have a cylindrical cross section of about 0.25 inch diameter. This small cross section or profile probably aids in cooking by minimally interfering with various cooking phenomena.

The drip bars 14 is ideally suited for supporting larger items above the microwave oven floor, or for supporting items which could be hung from the cross bar 38. Examples of the large items could be vegetables or other such items as frozen entrees; examples of hanging items could be strips of meat, or pasta to be cooked or dried, the single upright shaft 36 allows for the microwaves to be interrupted in a very small area of this support, thus allowing for more effective and more evenly cooked foods.

Figure 6:
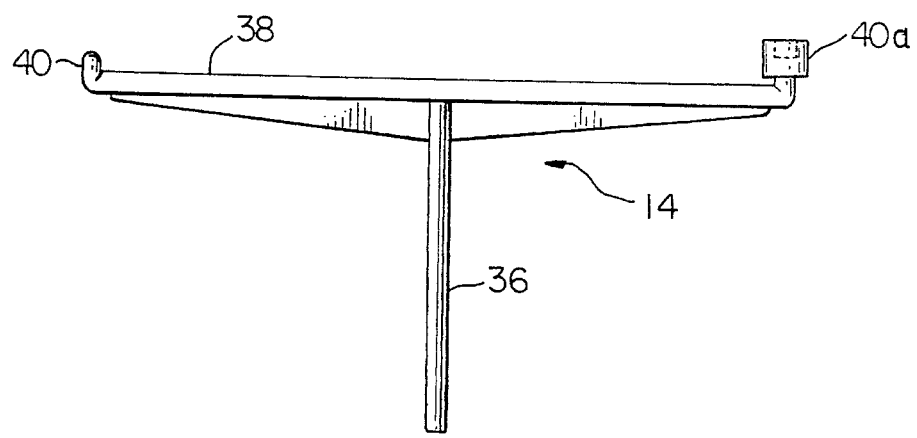
FIG. 6 shows a drip bar type removable support.

FIG. 6 shows one of the drip bars. The lower end of upright 36 is cylindrical like the rest of the upright to fit snugly into the receptacle 29. Of course this shape could be prismatic shape to key into a correspondingly shaped receptacle to maintain the uprights in a particular orientation and prevent rotation that would permit the food supported therefrom to be positioned less than optimally. Rightmost protrusion 40a is shown here as including a receptacle (shown in phantom.) Similar to receptacle 29 in the protrusion 28 of the base unit, this upright 40a can itself receive an upright of a further food support, such as another drip bar 14. In this way, another layer of foods to be processed can be added which would occupy a volume of the microwave oven even higher than those food portions on the first set of food supports. Protrusion 40 could of course also support further food supports which would have cavities on their lower extremities sized to receive the protrusion 40. This branching or dendritic assembly of parts makes a remarkably efficient, versatile, and easily assembled and disassembled system.

Figure 7:
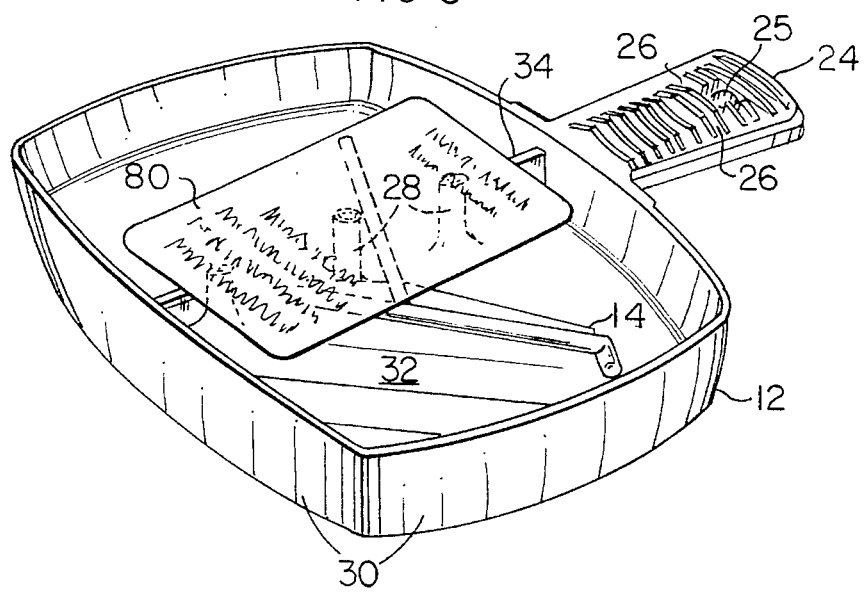
FIG. 7 shows the microwave cooking system of FIGS. 1 through 6 disassembled for sale or storage.
Figure 8:
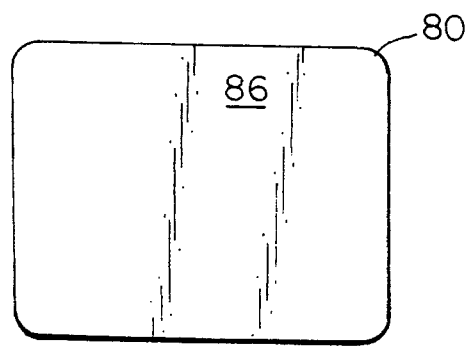
FIG. 8 and FIG. 9 respectively show a front and side view of the storage clip used in FIG. 7.
Figure 9:
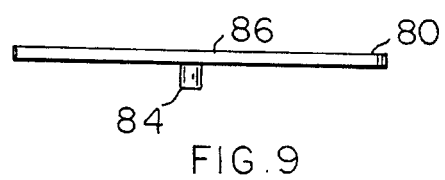

Referring to FIGS. 7 and 8, clip 80 includes at least one protruding stud 84 extending down from a central portion of planar member 86. This clip is preferably made of injection molded plastic, conveniently of the same plastic as the rest of the microwave appliance. The protruding stud has the same shape, and in this case circular cross section as the lower end of upright member 36. In use, this stud frictionally engages the protrusions 28 in the same way the uprights of the drip bars engage the protrusions. Merchandising or use instructions may conveniently be molded or printed on the upper surface of planar member 84. Note that the planar member has a generally rectangular shape so that it overlaps much of the central area of the base member or dish 12 when it is attached. While FIG. 8 shows one drip bar 14 lying in the dish and trapped between protrusions 28 and beneath the clip 80, obviously several drip bars can be stacked together and stored in the base dish. The planar member 84 thus holds the drip bars and the dish firmly together in a compact and secure manner so the system can be sold as a unit. The system can stay in this compact form until the system is to be assembled as in FIG. 1 for use in a microwave oven.

Indeed, the dish, the drip bars, and the clip can be hung as a unit from a typical mass merchant rack display system and use little or no collateral material, at most a small cardboard jacket or loop, to sell.

Use of the cooking system will now be described. The clip 80 is removed from the dish, exposing several, preferably three, drip bars which are plugged into their respective receptacles 28. The horizontal portions 38 of the drip bars are adjusted until they are parallel to one another and above the dish as shown in the figures. Bacon strips are hung, one next to the other over the horizontal bars one half each hanging on either side of the bars. When the desired number of strips are so hung, a single sheet of paper toweling is hung over the bars and suspended bacon strips to drape over the whole assembly forming a drape or tent for splatter protection which extends from one of the longer sides of the dish 12, over all the drip bars and bacon strips, and down to the opposite side of the dish. Once assembled, the system is placed into the microwave oven and the bacon is cooked in a conventional manner.

The hot grease accumulates in the dish and the cooked bacon strips remain on the bars until removed. Using the handle 24, the assembly is removed from the oven, the paper towel is carefully removed, and the bacon strips can now be carefully removed after cooling. Also, the excess grease once safely cooled, can be easily poured from a corner into a different container, and the system can be reused immediately to cook more bacon or disassembled for easy cleaning.

The entire assembly, especially the base unit or dish is preferably made of a microwave transparent material of well known type. Thermoplastic or thermoset polymer materials compatible with food preparation. Ceramic materials could also be used. Such materials have the further advantage that all are also compatible with the cold temperature conditions experienced in freezer units. Thus the invention could be used to cook food initially, store the cooked food by freezing, and eventually reheating by microwave radiation or conventional ovens.

The disclosed system is remarkably effective in cooking bacon strips. The bacon strips are very evenly cooked, with leaner striations, which normally over cook when submersed in the hot fat in traditional frying, are relatively moist. This seems to true even when the fattier striations have been crisped. It is suspected that this phenomenon is aided by the fact that the strips hang almost completely free of contact with the supporting structures. The small radius of the bars 38 limits contact to a band only about 0.375 inch wide. Thus, it is likely surface tension at the contacting surfaces of the food and any support, which would normally hold the liquified grease in contact with the cooking food in those contacting areas, is all but eliminated, permitting gravity to more thoroughly drain the grease into the dish.

A variety of different types of supports attachable to the disclosed dish are contemplated as part of the present invention. These include, but are not limited to: skewers for supporting corn on the cob or potatoes, drip bar type supports used for supporting strips of meat or bacon, a screen mesh for cooking smaller individual food portions, a ribbed grate for supporting frozen foods, and a rack used for cooking potato chips or french fries. All of these supports can be firmly attached to the dish via the protrusions 28. Alternatively, is indicated above, a support or supports similar to drip bar 14 can be attached to the dish protrusions, and these in turn can attach further food supports (such as skewers, browning grids, or indeed further drip bars.) In this situation, uprights 36 would be much shorter than those shown in the drawings. Indeed depending on the foods to be cooked, the uprights could be just tall enough to place protrusions 40 at about the upper edge of dish sides 30. Alternately, uprights 36 could be different lengths to better array the foods that each bar 38 directly or indirectly supports.

These supports may also have a browning surface of well known type for browning of foods as they are cooked in the microwave. Additionally it is contemplated that this dish base have a means to secure a cover for the purpose of food storage and/or the retaining of moisture to create steam and subsequent adjustable levels of pressure when preparing foods that benefit from such cooking.

The removeability of the various supports allows for much easier cleaning of all system components. Also contemplated and contributing to ease of cleanability is the addition of rounded inner surfaces in the base unit (as opposed to being squared off). A further refinement which also adds to ease of cleanability of the base unit is a septum or partition dividing the unit into two or more separate compartments.

We claim:

1. A system for improving the performance of a microwave oven, comprising:

a. a dish base unit having a lower surface for resting on the floor of the microwave oven;

b. contiguous raised sides surrounding said lower surface;

c. said sides being upstanding from said lower surface;

d. receptacles for firmly attaching upright, replaceable supports to said base unit; and e. upright, replaceable supports sized to extend above the contiguous sides when attached to said receptacles for allowing the item desired to be irradiated to be raised above said lower surface, wherein at least one of said upright, replaceable supports comprise a substantially horizontal, elongated, cross piece supported by a centrally substantially vertical member mounted at a central location of said substantially horizontal, elongated, cross piece, the lower end of said vertical member is adapted to be received by said receptacle, said substantially horizontal, elongated, cross piece sized to support said item desired to be irradiated such that it is substantially out of contact with said vertical member.

2. The system of claim 1, wherein all components are fabricated from a microwave compatible material.

3. The system of claim 1, wherein all components are fabricated from a freezer compatible material.

4. The system of claim 1, wherein said replaceable supports include uprights shaped to be firmly received in said receptacles.

5. The system of claim 1 wherein each said substantially horizontal cross members includes at least two upwardly extending protrusions.

6. The system as set forth in claim 5 wherein one of each of said at least two protrusions is located on an end of said horizontal cross piece, and another of the said at least two protrusions is located on another end of said horizontal cross piece.

7. The system as set forth in claim 5 wherein at least one of each said at least two protrusions is sized to be firmly engaged by a further receptacle, whereby further replaceable supports may be in turn supported by said horizontal cross piece.

8. The system as set forth in claim 5 wherein at least one of each said at least two protrusions has a receptacle sized to firmly engage a further protrusion, whereby further replaceable supports may be in turn supported by said horizontal cross piece.

* * * * *